Figure 1:
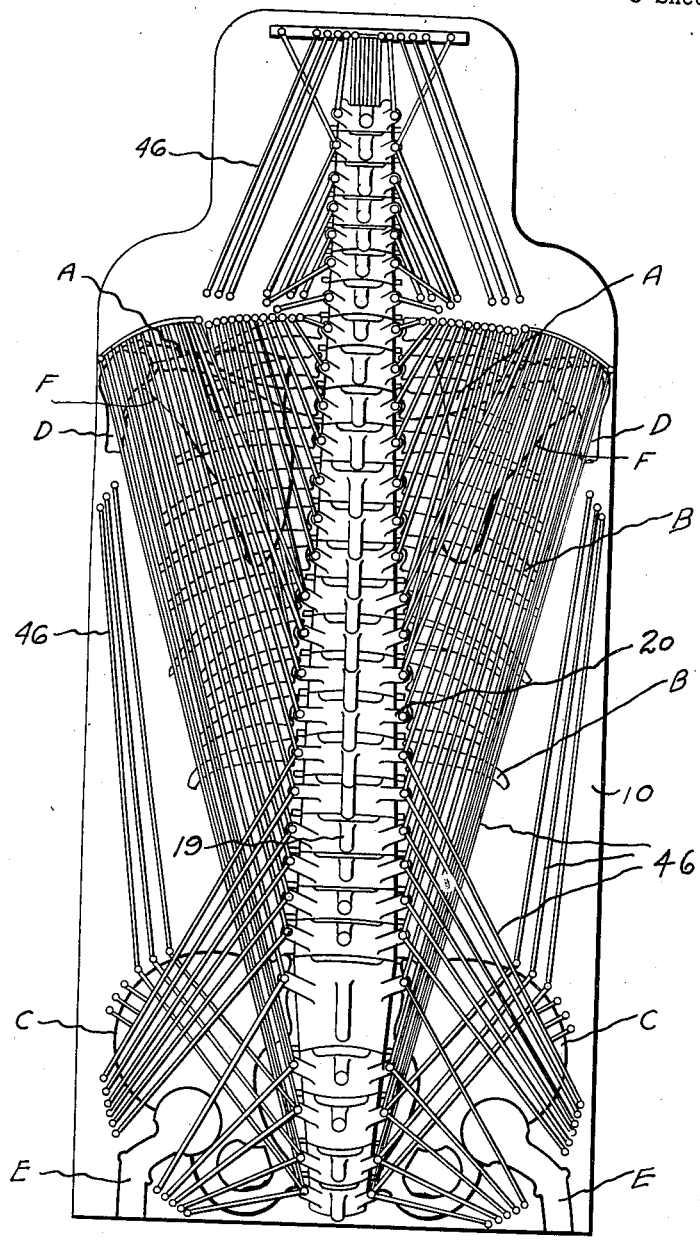

April 23, 1940.　　　　T. G. FLEET　　　　2,197,975
ANATOMICAL DEMONSTRATING DEVICE
Filed March 21, 1938　　　3 Sheets-Sheet 1

Inventor
THURMAN G. FLEET
By　Jack A. Shelly
Attorney

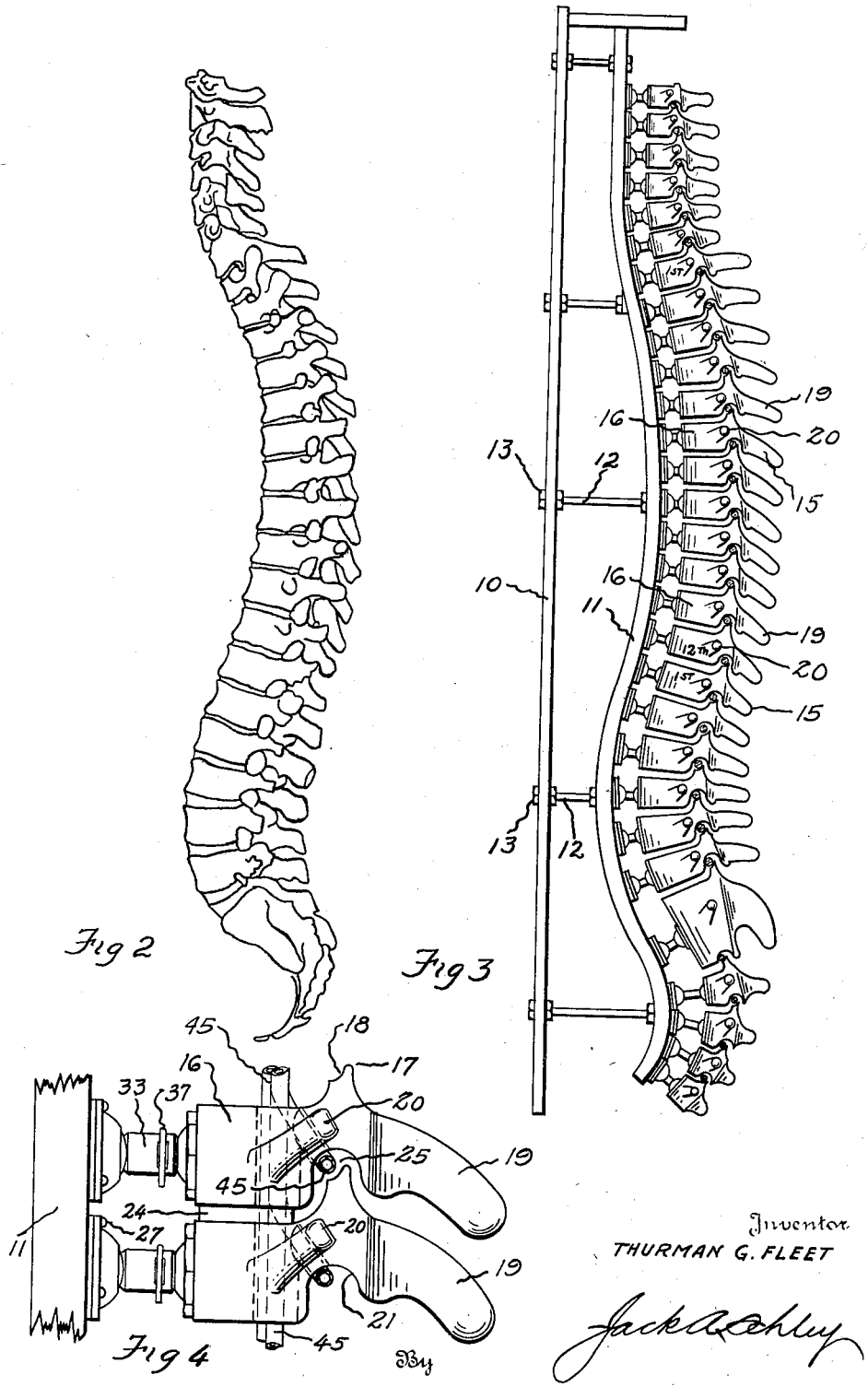

April 23, 1940.     T. G. FLEET     2,197,975
ANATOMICAL DEMONSTRATING DEVICE
Filed March 21, 1938     3 Sheets-Sheet 3
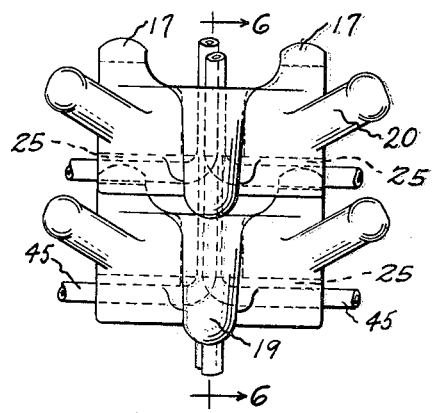
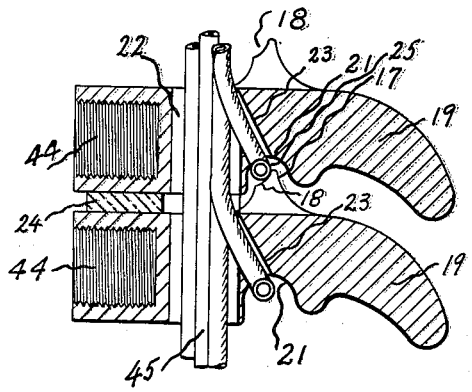
Fig 5     Fig 6
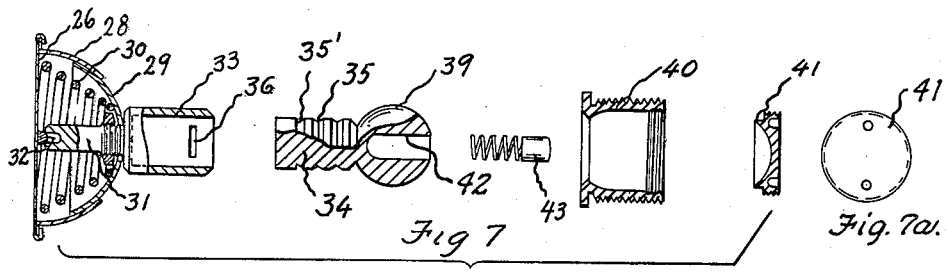
Fig 7     Fig. 7a.
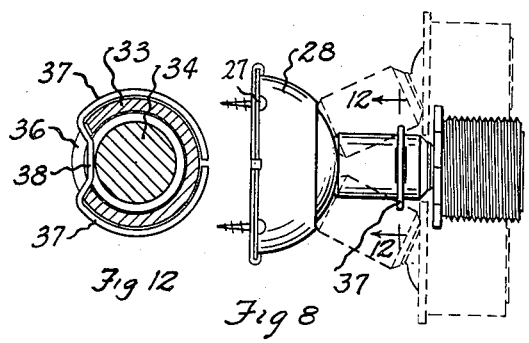
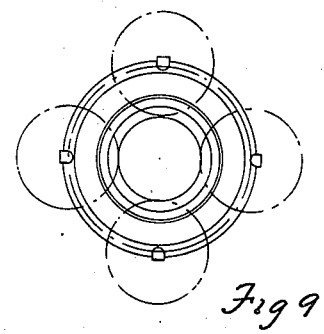
Fig 12     Fig 8     Fig 9
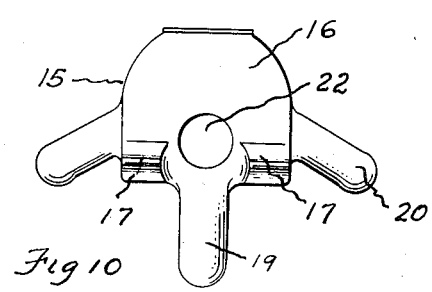
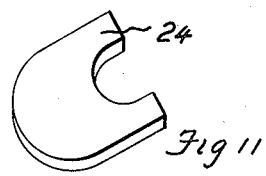
Fig 10     Fig 11
Inventor
THURMAN G. FLEET
By Jack A. Ashley
Attorney Patented Apr. 23, 1940

2,197,975

UNITED STATES PATENT OFFICE 2,197,975

ANATOMICAL DEMONSTRATING DEVICE

Thurman G. Fleet, San Antonio, Tex., assignor of one-half to James L. Price, San Antonio, Tex.

Application March 21, 1938, Serial No. 197,153

18 Claims. (Cl. 35—17)

This invention relates to new and useful improvements in anatomical demonstrating devices.

One object of the invention is to provide an improved demonstrating device wherein the human spine and the actual, natural movements thereof, are simulated to a fine degree, whereby dislocations, subluxations and displacements, together with its effects on nerves and muscles may be visually demonstrated.

An important object of the invention is to provide a demonstrating device including, an artificial human spine formed of vertebrae capable of movement with relation to each other in exactly the same manner as the vertebrae of the human spine, together with artificial muscles, ligaments, nerves, blood vessels and cartilage located and mounted in their natural manner, whereby manipulation of the vertebrae will clearly demonstrate and illustrate different conditions that may exist within the human body; the device being so constructed that any of the following subluxations may be demonstrated, viz: anterior, posterior, right, left, inferior, superior, rotations, curvatures and scoliosis.

A further object of the invention is to provide an improved device of the character described, wherein the spinal column, and its associate parts, are mounted upon a display board which has outlined on its surface the human skeleton, ribs, pelvis, scapula, clavicle, arms and legs, said outline being located in proper relation to the spinal column, whereby the effect of various positions of the spinal column on the different parts of the body may be readily illustrated.

A particular object of the invention is to provide an improved mounting for an artificial human spine which includes means for individually supporting each vertebra of the spine in each proper position; the support for each vertebra being such that said vertebra is capable of a universal movement with relation to the adjacent vertebra, whereby the different positions which a human spine may assume may be accurately simulated.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a front elevation of an anatomical demonstrating device, constructed in accordance with the invention, Figure 2 is an exact outline of the human spine, showing the natural position of the vertebrae, Figure 3 is a side elevation of the artificial vertebrae of the device, Figure 4 is an enlarged, side elevation of two of the artificial vertebrae and their mounting, Figure 5 is a front elevation of the parts shown in Figure 4, Figure 6 is a transverse, vertical, sectional view taken on the line 6—6 of Figure 5, Figure 7 is a view, of the various parts, disassembled, of the mounting of each vertebra, Figure 7a is a plan view of one part of the mounting of each vertebra, Figure 8 is an elevation of the assembled mounting and showing the various positions of the same, Figure 9 is a schematic face view of the mounting, illustrating the various positions to which it may be moved, Figure 10 is a plan view of one of the vertebra, Figure 11 is an isometric view of one of the plates which represent the cartilage between the vertebrae, and Figure 12 is a transverse, vertical, sectional view taken on the line 12—12 of Figure 8.

In the drawings, the numeral 10 designates a mounting board, or panel, which may be constructed of wood, presswood, glass, or other material having sufficient rigidity or stiffness to maintain its shape when in an upright position. The upper portion of the human skeleton is outlined on the face of this board and as shown in Figure 1, the clavicles A, ribs B, pelvis C, portions of the arms D, portions of the legs E and scapulas F are illustrated in their proper relation to each other. If desired, the internal organs of the body, which are not shown, may also be outlined on the board, or panel, and if this is done, it would be preferable that said internal organs be shown on a transparent section suitably mounted on the board so that light rays could be employed to illuminate such transparent section to more clearly demonstrate the internal organs.

A supporting bar 11, which is curved to approximate the natural curvature of the human spinal column, is secured to the central portion of the board, and is located in the same relation to the outline of the human skeleton on the board as is the human spine with relation to the human skeleton. By observing Figures 2 and 3, it will be seen that the curvature of the bar is substantially the same as the human spine. The bar 11 is secured to the board by elongate spacer bolts 12 and nuts 13 which rigidly fasten the bar in its proper position and which also space said bar from the face of the board.

As is well known to those skilled in the medical and anatomical art, the human spine comprises twenty-nine vertebrae which are referred to by name, viz: Atlas, the second to the seventh cervical, the first to the twelfth thoracic or dorsal, the first to the fifth lumbar, the sacrum, and finally the coccyx. These vertebrae are located one above the other in the curvature shown in Figure 2 and each is separated from the adjacent one by cartilage. The spinal cord, consisting of nerves, extends through the vertebrae and the back muscles extend outwardly from the vertebrae to the various parts of the body. According to chiropractic theory, any displacement or dislocation of the vertebrae from their correct and normal position effects the cartilage, nerves and muscles, to cause various pains or aches in the human body.

The human spine is reproduced and mounted on the supporting bar 11 and, as is clearly shown in Figure 3, the spine is constructed of twenty-nine vertebrae 15, each of which is formed to accurately simulate its corresponding vertebra in the human spine. The vertebrae 15 are mounted on the bar throughout the length thereof and follow the curvature of said bar, whereby said vertebrae form a substantial duplicate of the human spine. In order to permit individual movement of each vertebra so as to simulate dislocations and subluxations of the human spine, each vertebra is mounted so as to be capable of individual universal movement with relation to the adjacent vertebra, as will be presently explained.

Each vertebra is constructed of wood, or molded of plastic material, such as synthetic resins or glass and includes a body portion 16 having a substantially square shape in cross-section, the two inner, vertical corners of said body being cut away or rounded, as shown in Figure 10. The angular outer corners at the body are each provided with an upwardly extending projection 17, which projections are spaced from each other (Figure 5). The upper surface or top of each projection is concaved or curved inwardly at 18, as clearly shown in Figure 6. An extension or projection 19, which simulates the spinous process of the vertebrae, extends outwardly and downwardly of the body 16, while the transverse processes of each vertebra are represented by inclined projections or arms 20, which extend outwardly from the sides of the body 16. A transverse groove or recess 21, substantially semi-circular in cross-section, is formed in the underside of the body 16 and projection 19 and is located directly below the lugs 17 at the upper end of the body (Figure 6). A circular opening or bore 22 is provided in the body 16, being located between the lugs 17, while an inclined passage 23 extends from the bore 22 to the base of the transverse recess or groove 21, whereby communication between the bore and groove may be had.

When the vertebrae are mounted one above the other in simulation of the human spine, an elastic plate or pad 24 (Figures 6 and 11), which is constructed of rubber, or similar material, is interposed between the body 16 of each vertebra. This pad, or plate, represents the cartilage and acts to position each vertebra in its proper relation to the adjacent vertebra. When the vertebrae are in their normal or proper position, the opening 22 in the body 16 of each vertebra is alined with the openings 22 of the other vertebrae, whereby a continuous opening, which simulates the vertebral foramen, or space for the spinal cords, is provided through the length of the artificial spine. The lugs 17 of each vertebra extend upwardly into the transverse groove or recess 21 in the underside of the next above vertebra, and the concave upper ends of said lugs coact with the rounded contour of the bottom of the groove to form a transverse passage 25 (Figure 6) which simulates the usual transverse foramen for the nerves, as will be explained. Manifestly, since the vertebrae are separated by the elastic or resilient pads or plates 24, the vertebrae may be moved and tilted with relation to each other.

The mounting of each vertebra is such as to permit universal, individual movement and as clearly shown in Figure 7, each mounting includes a base plate 26 which is fastened to the outer side of the supporting bar 11 by screws 27, or other means. An annular ring 28, having a spherical contour or shape, is suitably secured to the base plate, preferably by providing lugs on said plate and crimping said lugs over a flange on the ring. Within the annular ring 28 is disposed a semi-spherical shell 29, which has its outer surface complementary to the inner surface of the ring, whereby a universal movement of the shell with respect to the ring may be had. A coiled spring 30 is confined within the ring 28 between the shell and the base plate and exerts its pressure to constantly hold the shell in contact with the ring.

A stem 31 extends axially through the shell 29, being rigidly secured thereto, and the inner end of this stem is forked to engage a lug 32 formed axially of the base plate 26. The lug is located at the common center of the shell and ring and provides the fulcrum upon which the stem rotates when the shell is moved with relation to the ring. If desired, the space formed interiorly of the shell and ring may be filled with a light lubricant to lubricate the moving parts of the universal joint.

The stem 31 extends through the shell 29 and an enlarged cylinder 33 or ferrule is made integral with said stem. The inner end of the cylinder abuts the outer surface of the shell and manifestly, since the cylinder and stem are made integral and said stem is secured to the shell 29, the cylinders move with the shell. A shank 34 is slidable within the cylinder or ferrule 33 and this shank is formed with a plurality of annular grooves 35. For holding the shank in a desired position within the cylinder, a radial slot 36 is provided in said cylinder and a steel wire 37 encircles said cylinder. The ring is split and has an offset 38 therein and this offset extends through the slot, so as to engage within the grooves of the shank and thereby acts to frictionally hold the shank in various positions within the cylinder, the position being dependent upon the particular groove engaged by the offset. All of the grooves, except the innermost groove, are substantially V-shape in cross-section so that the offset 38 may ride from one groove to the next when a movement is imparted to the shank. However, the innermost groove has one radial or flat side 35' whereby when the offset engages this groove, the shank cannot be pulled from the cylinder.

The outer end of the shank 34 has a ball 39 integral therewith and this ball engages within a collar 40. The collar has one end of its bore curved inwardly and the ball seats on this curved portion, being held in engagement therewith by a plug 41 (Figure 7a) which is threaded into the opposite end of the bore. The inner surface of the plug is concave to fit the surface of the bore whereby a universal connection between the shank 34 and collar 40 is had. Thus, the collar may be moved with relation to the shank and for holding said collar in various adjusted positions, the outer surface is recessed as shown at 42. A spring-pressed pin 43 is located within the recess and engages the concave surface of the plug 41, whereby the frictional contact between the pin and plug holds the ball and collar in any position to which it may be moved.

The outer surface of the collar 40 of each mounting is externally screw-threaded, while the body of each vertebra is formed with an internally threaded bore 44 which receives said collar, whereby the vertebra is carried by said collar. With such arrangement, each vertebra is secured to the supporting bar 11 by a double universal mounting. The various positions to which the vertebra may be swung or rotated are clearly shown in Figures 8 and 9. Each vertebra may further undergo lateral movement with relation to the bar 11 by sliding the shank 34 inwardly or outwardly of the cylinder 33. Therefore, each vertebra is individually movable with relation to the adjacent vertebra into any position which the human vertebrae might move.

To simulate the nerves which extend through the spinal column, rubber tubes 45 extend through the vertebral foramen formed by the openings 22 in the vertebrae, as well as through the inclined passages 23 and transverse foramens 25. Each tube is preferably of a different color to distinguish it from the others and after extending downwardly through several vertebrae, passes through the inclined passage 23 of one vertebra and then outwardly through the transverse channels or passages 25, as clearly shown in Figure 5. The tubing is of such size that when the vertebra is in a normal position, said tubing is not pinched or pressed at any point.

For representing the muscle fibres, a plurality of elastic bands 46 extend from the projections or arms 20, which represent the transverse processes of the vertebrae, to the surface of the mounting board. One end of each band is suitably attached to the arm 20, while its other end is attached to the board in close proximity to that part of the skeleton to which it refers and with which it cooperates. A group of these bands represents a group of muscular tissues, the names of which groups are familiar to those skilled in the anatomical art. The elastic bands are drawn reasonably taut so that when the vertebrae are properly positioned and held in such position by the frictional contact between the pins 43 and plugs 41, the bands will not be under great tension.

From the foregoing, it will be seen that a substantial duplicate of the human back is produced and by manipulating the vertebrae, that is, by rotating, retracting and swinging said vertebrae, it is possible to visually demonstrate subluxations, lateral curvatures and other displacements and further, it is even possible to show breaks in the spinal column. When any one of the vertebra is displaced out of its normal position, a pinching or pressing of the rubber tubes passing therethrough occurs, and this pinching or stricture simulates the stricture of the nerve when the human vertebra is dislocated. Further, a rotation of any vertebra will cause the elastic band on one side to relax while the band on the opposite side is stretched or placed under tension. The effects of the stretching of the band simulates the strain placed on the muscles when the human vertebra is dislocated.

The dislocation or displacement of the vertebrae in all directions may be quickly and easily accomplished and when any vertebra is moved to a position, it will remain in such position due to the construction of the double universal. The device not only demonstrates the dislocation of the vertebrae but also the effects of the dislocation on the muscles and nerves associated therewith. The device is particularly adapted for educational purposes, not only to pupils in anatomy but also to patients, whereby a physician may clearly illustrate to his patient the results of dislocations of the vertebrae.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent is:

1. An anatomical demonstrating device including, a rigid supporting bar having a curvature similar to the curvature of the human spine, and a plurality of artificial vertebrae mounted on the bar in superposed relation to simulate the human spine arranged for universal and rectilinear movement independently of said bar.

2. An anatomical demonstrating device including, a rigid supporting bar having a curvature similar to the curvature of the human spine, and a plurality of artificial vertebrae mounted on the bar in superposed relation to simulate the human spine, each vertebra being mounted for individual rotatable and inward and outward movement with relation to adjacent vertebrae and the bar, whereby dislocations and displacements of the vertebrae of the human spine may be demonstrated.

3. An anatomical demonstrating device including, a rigid supporting bar having a curvature similar to the curvature of the human spine, a plurality of vertebrae members simulating the vertebrae of the human spine, and means for mounting the vertebrae members on the bar so that each member may undergo individual universal movement with relation to adjacent members, whereby the members may be manipulated to illustrate various displacements of the vertebrae of the human spine.

4. An anatomical demonstrating device including, a rigid supporting bar having a curvature similar to the curvature of the human spine, a plurality of vertebrae members simulating the vertebrae of the human spine, means for mounting the vertebrae members on the bar so that each member may undergo individual universal movement with relation to adjacent members, whereby the members may be manipulated to illustrate various displacements of the vertebrae of the human spine, and an elastic plate interposed between each vertebra member and holding the members in their proper spaced relation, said plates representing the cartilage of the human spine.

5. An anatomical demonstrating device including, a supporting bar having a curvature similar to the curvature of the human spine, a plurality of artificial vertebrae mounted on the bar in superposed relation to simulate the human spine, each vertebra being mounted for individual universal movement with relation to adjacent vertebrae and the bar, whereby dislocations and displacements of the vertebrae of the human spine may be demonstrated, the vertebrae having openings and passages therein and therebetween, and a plurality of rubber tubes extending through said openings and simulating the nerves of the human spine, said tubes being pinched when the vertebrae are displaced from a normal position to demonstrate the effect of the displacement of the human vertebrae on the human nerves.

6. An anatomical demonstrating device including, a supporting bar having a curvature similar to the curvature of the human spine, a plurality of artificial vertebrae mounted on the bar in superposed relation to simulate the human spine, each vertebra being mounted for individual universal movement with relation to adjacent vertebrae and the bar, whereby dislocations and displacements of the vertebrae of the human spine may be demonstrated, the vertebrae having openings and passages therein and therebetween, a plurality of rubber tubes extending through said openings for demonstrating the nerves of the human spine, said tubes being pinched when the vertebrae are displaced from a normal position to demonstrate the effect of the displacement of the human vertebrae on the human nerves, and a plurality of elastic bands for demonstrating the muscles of the human body attached to the vertebrae, whereby movement of the vertebrae from a normal position places said bands under tension or relaxes the same to demonstrate the effect of vertebral displacement on the human associated therewith.

7. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, and a plurality of artificial vertebrae mounted for universal movement on the bar and in superposed relation to simulate the human spine.

8. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, and a plurality of artificial vertebrae mounted on the bar in superposed relation to simulate the human spine, each vertebra being arranged for vertical, lateral and universal movement with relation to adjacent vertebrae and the bar, whereby dislocations and displacements of the human spine may be visually demonstrated.

9. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, a plurality of artificial vertebrae mounted on the bar in superposed relation to simulate the human spine, each vertebra being arranged for a vertical, lateral and universal movement with relation to adjacent vertebrae, whereby dislocations and displacements of the human spine may be visually demonstrated, the vertebrae having openings and passages therein and therebetween, and a plurality of rubber tubes extending through said openings for demonstrating the nerves of the human spine, said tubes being pinched when the vertebrae are displaced from a normal position to demonstrate the effect of the displacement of the human vertebrae on the human nerves.

10. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, a plurality of artificial vertebrae mounted on the bar in superposed relation to simulate the human spine, each vertebra being arranged for a vertical, lateral and universal movement with relation to adjacent vertebrae, whereby dislocations and displacements of the human spine may be visually demonstrated, the vertebrae having openings and passages therein and therebetween, a plurality of rubber tubes extending through said openings for demonstrating the nerves of the human spine, said tubes being pinched when the vertebrae are displaced from a normal position to demonstrate the effect of the displacement of the human vertebrae on the human nerves, and a plurality of elastic bands representing the muscles of the human body attached to the vertebrae, whereby movement of the vertebrae from a normal position places said bands under tension or relaxes the same to demonstrate the effect of vertebral displacement on the human associated therewith.

11. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, a plurality of vertebrae members simulating the vertebrae of the human spine, means for mounting the vertebrae members on the bar in superposed relation and in such manner that each member may undergo vertical, horizontal and universal movement with relation to the adjacent members, whereby the members may be manipulated to illustrate various displacements of the vertebrae of the human spine, and an elastic plate interposed between the members for holding the members in their proper spaced relation, said plates representing the cartilage of the human spine.

12. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, a plurality of vertebrae members simulating the vertebrae of the human spine, means for mounting the vertebrae members on the bar in superposed relation and in such manner that each member may undergo vertical, horizontal and universal movement with relation to the adjacent members, whereby the members may be manipulated to illustrate various displacements of the vertebrae of the human spine, an elastic plate interposed between the members for holding the members in their proper spaced relation, said plates representing the cartilage of the human spine, the vertebrae members having openings and passages therein and therebetween, and a plurality of rubber tubes extending through said openings and simulating the nerves of the human spine, said tubes being pinched when the vertebrae members are displaced from a normal position to demonstrate the effect of the displacement of the human vertebrae on the human nerves.

13. An anatomical demonstrating device including, a panel having the human skeleton outlined thereon, a supporting bar disposed longitudinally and centrally of the panel and having a curvature substantially the same as the curvature of the human spine, said bar being located in the same relation to the skeleton outlined thereon as the human spine is located to the human skeleton, a plurality of vertebrae members simulating the vertebrae of the human spine, means for mounting the vertebrae members on the bar in superposed relation and in such manner that each member may undergo vertical, horizontal and universal movement with relation to the adjacent members, whereby the members may be manipulated to illustrate various displacements of the vertebrae of the human spine, an elastic plate interposed between the members for holding the members in their proper spaced relation, said plates representing the cartilage of the human spine, the vertebrae members having openings and passages therein and therebetween, a plurality of rubber tubes extending through said openings representing the nerves of the human spine, said tubes being pinched when the vertebrae members are displaced from a normal position to demonstrate the effect of the displacement of the human vertebrae on the human nerves, and a plurality of elastic bands representing the muscles of the human body attached to the vertebrae members, whereby movement of the vertebrae members from a normal position places said bands under tension or relaxes the same to demonstrate the effect of vertebral displacement on the human associated therewith.

14. An anatomical demonstrating device including, a panel having the human skeleton outlined thereon, a supporting bar secured to the panel and having a curvature substantially the same as the curvature of the human spine, said bar being located on the panel in the same relation to the skeleton outlined thereon as the human spine is located to the human skeleton, a plurality of artificial vertebrae similar in number to the number of vertebrae in the human spine and adapted to be mounted in superposed relation on the bar, a mounting for each vertebra comprising a cylinder mounted for universal movement on the bar, a shank attached to the vertebra so that said vertebra may undergo universal movement with relation to the shank, said shank telescoping the cylinder so that the vertebra carried by said shank may be moved laterally with relation to the supporting bar, and means for holding the shank in various positions within the cylinder.

15. An anatomical demonstrating device including, a panel, a support mounted longitudinally of the panel and curved to simulate the curvature of the human spine, a plurality of artificial vertebrae, means for universally mounting each vertebrae on said support, and elastic cords extending from each vertebrae to the panel for representing the human muscles.

16. An anatomical demonstrating device including, a panel, a support mounted longitudinally of the panel and curved to simulate the curvature of the human spine, a plurality of artificial vertebrae, means for universally mounting each vertebrae on said support, and elastic cords extending from each vertebrae to the panel for representing the human muscles, each vertebrae being so mounted as to remain in the position to which it is adjusted.

17. An anatomical demonstrating device including, a support having a curvature representing the curvature of the human spine, a plurality of artificial vertebrae members, and universal means for individually mounting each vertebrae member on the support for individual and independent lateral vertical and rectilinear movement.

18. An anatomical demonstrating device including, a panel having a portion of a human skeleton represented thereon, a plurality of artificial spinal vertebrae members mounted on the panel and each arranged for independent universal movement, elastic means disposed between the vertebrae members for demonstrating spinal nerves, and elastic cords extending from opposite sides of the vertebrae members to the panel for representing and demonstrating human muscles.

THURMAN G. FLEET.